US007100160B2

(12) United States Patent
LeFevre et al.

(10) Patent No.: US 7,100,160 B2
(45) Date of Patent: Aug. 29, 2006

(54) METHOD AND SYSTEM FOR IMPLEMENTING HOST-DEPENDENT SCSI BEHAVIOR IN A HETEROGENEOUS HOST ENVIRONMENT

(75) Inventors: Marc LeFevre, Boise, ID (US); Stephen Mooney, Boise, ID (US); Randy J. Matthews, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 748 days.

(21) Appl. No.: 09/981,906

(22) Filed: Oct. 19, 2001

(65) Prior Publication Data

US 2003/0079119 A1   Apr. 24, 2003

(51) Int. Cl.
  *G06F 9/46* (2006.01)
  *G06F 9/00* (2006.01)
  *G06F 12/00* (2006.01)
  *G06F 13/00* (2006.01)
(52) U.S. Cl. ............... 718/100; 719/318; 713/201; 711/163; 710/107
(58) Field of Classification Search ........ 718/100–104; 713/201; 719/318; 711/163; 710/107
See application file for complete search history.

(56) References Cited

U.S. PATENT DOCUMENTS 5,210,795 A * 5/1993 Lipner et al. ............... 713/187
5,608,908 A * 3/1997 Barghouti et al. .......... 719/318
5,615,368 A * 3/1997 Terashima et al. ......... 718/101
5,822,565 A * 10/1998 DeRosa et al. ............... 703/24
5,890,014 A * 3/1999 Long ............................ 710/8
6,012,081 A * 1/2000 Dorn et al. ................. 718/102
6,061,753 A * 5/2000 Ericson ....................... 710/107
6,185,567 B1 * 2/2001 Ratnaraj et al. .............. 707/10
6,185,601 B1 * 2/2001 Wolff ........................ 709/203
6,289,463 B1 * 9/2001 Fink .......................... 713/202
6,606,695 B1 * 8/2003 Kamano et al. ............ 711/163
2001/0034847 A1 * 10/2001 Gaul, Jr. .................... 713/201

* cited by examiner

*Primary Examiner*—Meng-Al T. An
*Assistant Examiner*—Jennifer N. To

(57) ABSTRACT

A method, system, and program product is provided for configuring a target device, the method comprising the steps of: receiving a log-in request to connect the target device to a host, wherein the log-in request includes a host designator; accessing a table of host designators and associated O/S types; determining if there is a match of the log-in request host designator to a host designator in the table; and selecting an O/S type protocol associated with the match to the host designator. In a preferred embodiment of the present invention, the host designator is a worldwide name. In a further embodiment of the present invention, the step is provided of determining if a mode parameter is set for a default O/S protocol; and selecting that default O/S protocol unless there is a match of the log-in request host designator in the table.

15 Claims, 1 Drawing Sheet

METHOD AND SYSTEM FOR IMPLEMENTING HOST-DEPENDENT SCSI BEHAVIOR IN A HETEROGENEOUS HOST ENVIRONMENT

FIELD OF THE INVENTION

The present invention relates generally to the field of host-target device connections, and more particularly, to the selection of an appropriate O/S protocol for command processing in these interconnections.

BACKGROUND OF THE INVENTION

As is well known the small computer system interface (SCSI) is a set of evolving ANSI standard electronic interfaces that allow personal computers and other host devices to connect and communicate with peripheral hardware such as disk drives, disk arrays, tape drives, tape arrays, printers, scanners, and various other target devices. As is well known, the ANSI standards and various other standards were defined with certain ambiguities therein. The various operating systems (O/S) handle these ambiguities in different ways, and require different protocols in order to properly communicate. Examples of O/S's with different protocols include WIN NT, HPUX, and the LINUX system. This difference in operating systems causes significant problems for target devices when processing commands from host devices. A target device will not be able to satisfy all host O/S types with a single behavior. Additionally, there is no intrinsic method for determining the correct behavior when processing any given command. The present invention is directed to solving this problem.

SUMMARY OF THE INVENTION

Briefly, the present invention comprises, in one embodiment, a method for configuring a target device, comprising the steps of: receiving a log-in request to connect the target device to a host, wherein the log-in request includes a host designator; accessing a table of host designators and associated O/S types; determining if there is a match of the log-in request host designator to a host designator in the table; and selecting an O/S type protocol associated with the match to the host designator.

In a further aspect of the present invention, the host designator is a worldwide name.

In a further aspect of the present invention, the step is provided of determining if a mode parameter is set for a default O/S protocol; and selecting that default O/S protocol unless there is a match of the log-in request host designator in the table.

In a further aspect of the present invention, the steps are provided of receiving a command from the host; and determining if the command is an O/S dependent command; and wherein the step of accessing the table is only performed if the received command is an O/S dependent command.

In a further aspect of the present invention, the step is provided of storing the table in non-volatile memory in the target device.

In a further aspect of the present invention, the target device is a memory array.

In a further embodiment of the present invention, a system is provided for configuring itself for a particular O/S, comprising: a table of system host system designators and associated O/S types; a component for receiving a log-in request to connect the system to a host, wherein the log-in request includes a host designator; a component for accessing the table of host designators and associated O/S types; a component for determining if there is a match of the log-in request host designator to a host designator in the table; and a component for selecting an O/S type protocol associated with the match to the host designator.

In a further aspect of the present invention, a component is provided for determining if a mode parameter is set for a default O/S protocol and selecting that default O/S protocol unless there is a match of the log-in request host designator in the table.

In a further aspect of the present invention, the a component is provided for receiving a command from the host and determining if the command is an O/S dependent command; and wherein the component for accessing the table only operates if the received command is an O/S dependent command.

In a further aspect of the present invention, the table is stored in non-volatile memory in the target device.

In a further embodiment of the present invention, a program product is provided for configuring a target device, comprising machine-readable program code for causing a machine to perform the following method steps: receiving a log-in request to connect the target device to a host, wherein the log-in request includes a host designator; accessing a table of host designators and associated O/S types; determining if there is a match of the log-in request host designator to a host designator in the table; and selecting an O/S type protocol associated with the match to the host designator.

In a further aspect of the present invention, code is provided for determining if a mode parameter is set for a default O/S protocol and selecting that default O/S protocol unless there is a match of the log-in request host designator in the table.

In a further aspect of the present invention, code is provided for receiving a command from the host and determining if the command is an O/S dependent command; and wherein the code for accessing the table is only executed if the received command is an O/S dependent command.

DETAILED DESCRIPTION OF THE PREFERRED EMBODIMENTS

Figure 1:
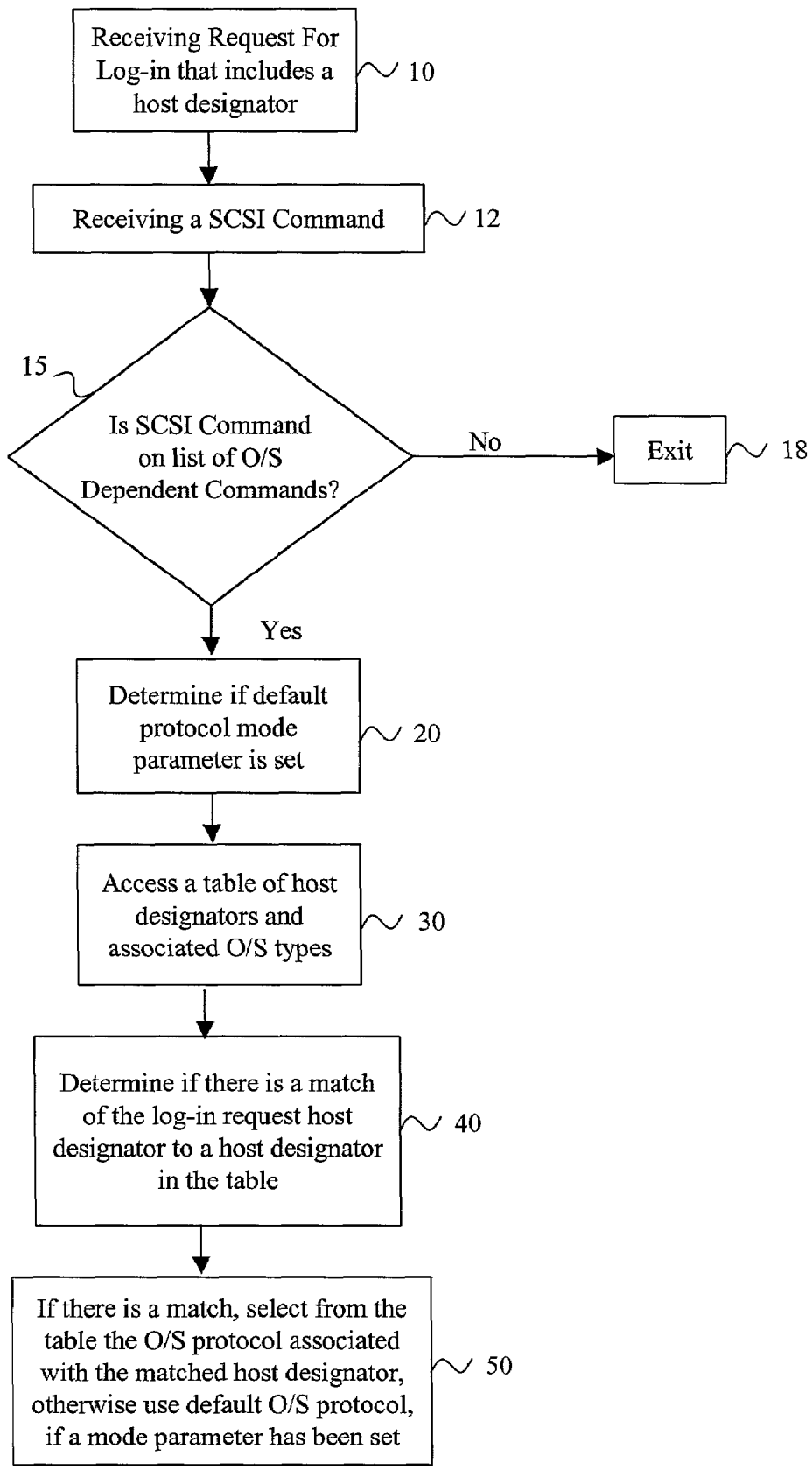
FIG. 1 is a schematic block diagram of a preferred embodiment of a flowchart to implement the present invention.

The present invention solves the foregoing problems by constructing and storing a table of host designators and associated operating system (O/S) types that may be used to select the correct O/S protocol. To facilitate this operation, a plurality of different O/S type protocols are stored in the target. The O/S type associated with the host designator is then used to select the correct O/S protocol. The table would be constructed by obtaining designators for one or more hosts, along with the operating system used by each of those different hosts. The table would list the host designator and an associated operating system (O/S). Thus, during a log-in procedure, the host would provide its host designator. Later, during the processing of SCSI commands from this host, it would be determined whether that host designator matched a host designator in the table. If a match was found, then the O/S protocol associated with that O/S type would be used in processing the command. In a preferred embodiment, the host designator would be the worldwide name for the host. Typically there will be a worldwide name for each host bus adapter, for example.

In a preferred embodiment of the present invention, the table would be stored in non-volatile memory that is physically located in the chassis of the target device. Typically, the loading of the table would be accomplished by means of a utility in the firmware for the target device. The result of this storage at the target device is that array controllers and other components may be replaced without having to re-specify O/S types for the various hosts which may be encountered.

Referring now to FIG. 1, there is shown a preferred embodiment of a flowchart for a method in accordance with the present invention. As a preparation for operating this flowchart, a table preferably has already been created which associates host designators with their O/S type, and this table has been stored in an accessible location, preferably in the chassis of the target device.

Accordingly, the first step, represented by block 10, comprises a host-target device log-in process wherein the host and the target device, such as a disk array controller, exchange information on capabilities of each device and form a communication connection. During this log-in process, the host would provide its host designator to the target device. As noted above, in a preferred embodiment this host designator may be a worldwide name.

After successful login, the target is allowed to receive commands from the host, as represented by block 12. For any given received command, the target determines whether the execution of the command depends on the protocol of the host in block 15. By way of example but not by way of limitation, this step could be performed by comparing the received command to a list of commands that have O/S dependent requirements. If the command executes without regard to the host protocol, the following steps are not performed and the routine is exited at block 18. If there is a match to an O/S dependent command, then the following steps are performed.

The next step in the process, represented by block 20, obtains the value of a mode parameter that defines the default O/S protocol. For example, this mode parameter could be set to default to a HPUX protocol for all worldwide names not listed in the table.

A further step in the process, represented by block 30, comprises accessing the aforementioned table which stores host designators and O/S types associated therewith. As noted above, in a preferred embodiment this table would be stored in the chassis of the target device, e.g., a disk array controller.

The method further includes the step, represented by block 40, of determining if there is a match of the host designator obtained during the log-in process in block 10, to a host designator in the table. If there is such a match to a host designator in the table, then the method operates to override the default mode parameter designation for the O/S protocol, and to select the O/S protocol associated with the matched host designator. This step is represented by block 50 in FIG. 1.

By way of example, but not by way of limitation, there could be one disk array controller and ten hosts. The aforementioned host designator table could provide a listing of a worldwide name for each of the ten hosts, and an associated O/S for each worldwide name.

As another example, there could be thirty-five hosts all using the HPUX O/S protocol, and there could be one other host which could utilize a different O/S protocol, such as a LINUX protocol. In this case, the mode parameter could be set to default to the HPUX O/S protocol, and the table could have only a single entry with the worldwide name for the host that has the LINUX O/S, and an associated representation for that LINUX O/S. Accordingly, in operation the method would always use the default HPUX protocol unless the host designator obtained during the log-in process matched the host designator in the table for the LINUX protocol.

It should be noted that the present invention is particularly useful for implementing fibre channel protocols, to allow the target devices to identify host device operating system types during log-in.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for configuring a target device to operate as peripheral hardware for a host device, comprising the computer-executed steps of:
   receiving a log-in request to connect the target device to the host device, wherein the log-in request includes a host designator identifying a type of host device;
   receiving a command from the host device;
   determining if the command is an operating system (O/S) protocol-type dependent command;
   only if the received command is an O/S protocol-type dependent command, accessing a table of host designators and associated O/S protocol types to determine if there is a match of the log-in request host designator to a host designator in the table; and
   selecting an O/S protocol associated with the match to the host designator such that the O/S protocol selected is used by the target device to interpret the command received from the host device.

2. The method as defined in claim 1, wherein the host designator is a worldwide name.

3. The method as defined in claim 1, further comprising the step of determining if a mode parameter is set for a default O/S protocol; and
   selecting that default O/S protocol unless there is a match of the log-in request host designator in the table.

4. The method as defined in claim 1, further comprising the step of storing the table in non-volatile memory in the target device.

5. The method as defined in claim 1, wherein the target device is a memory array.

6. The method as defined in claim 1, wherein the target device communicates with the host device via a SCSI interface.

7. The method as defined in claim 6, wherein the target device is directly connected to the host device via the SCSI interface.

8. A system for configuring itself for a particular O/S protocol, comprising:
   a table of system host system designators and associated O/S protocol types;

a first component for receiving a log-in request to connect the system to a host, wherein the log-in request includes a host designator;

a second component for receiving a command from the host and determining if the command is an O/S protocol-type dependent command;

a third component for accessing the table of host designators and associated O/S protocol types only if the received command is an O/S protocol-type dependent command;

a fourth component for determining if there is a match of the log-in request host designator to a host designator in the table; and a fifth component for selecting an O/S protocol associated with the match to the host designator such that the O/S protocol selected is used by the system to interpret the command received from the host.

9. The system as defined in claim 7, further comprising a sixth component for determining if a mode parameter is set for a default O/S protocol and selecting that default O/S protocol unless there is a match of the log-in request host designator in the table.

10. The system as defined in claim 8, further comprising a non-volatile memory, and wherein the table is stored in the non-volatile memory.

11. The system as defined in claim 8, wherein the target device is a peripheral device of the host.

12. The system as defined in claim 8, wherein the target device communicates with the host device via a SCSI interface.

13. The system as defined in claim 12, wherein the target device is directly connected to the host device via the SCSI interface.

14. A program product for configuring a target device, comprising machine-readable program code for causing a machine to perform the following method steps:

receiving a log-in request to connect the target device to a host, wherein the log-in request includes a host designator;

receiving a command from the host device;

determining if the command is an O/S protocol-type dependent command;

only if the received command is an O/S protocol-type dependent command, accessing a table of host designators and associated O/S types to determine if there is a match of the log-in request host designator to a host designator in the table; and selecting an O/S protocol associated with the match to the host designator such that the O/S protocol selected is used by the target device to interpret the command received from the host.

15. The program product as defined in claim 14, further comprising code for determining if a mode parameter is set for a default O/S protocol and selecting that default O/S protocol unless there is a match of the log-in request host designator in the table.

* * * * *

UNITED STATES PATENT AND TRADEMARK OFFICE
CERTIFICATE OF CORRECTION

| | |
|---|---|
| PATENT NO. | : 7,100,160 B2 |
| APPLICATION NO. | : 09/981906 |
| DATED | : August 29, 2006 |
| INVENTOR(S) | : Marc LeFevre et al. |

Page 1 of 1

It is certified that error appears in the above-identified patent and that said Letters Patent is hereby corrected as shown below:

In column 5, line 18, in Claim 9, delete "claim 7," and insert -- claim 8, --, therefor.

Signed and Sealed this

Twentieth Day of July, 2010

David J. Kappos
*Director of the United States Patent and Trademark Office*